United States Patent Office 3,392,168
Patented July 9, 1968

3,392,168
SUBSTITUTED DIHYDROBENZOTHIADIAZINES
Frantz Lund, Kongens Lyngby, and Wagn Ole Godtfredsen, Copenhagen, Denmark, assignors to Løvens Kemiske Fabrik ved A. Kongsted, Ballerup, Denmark, a firm
No Drawing. Continuation-in-part of application Ser. No. 808,863, Apr. 27, 1959. This application Aug. 6, 1959, Ser. No. 831,949
Claims priority, application Great Britain, Aug. 13, 1958, 26,063/58; Sept. 26, 1958, 30,897/58; Nov. 12, 1958, 36,437/58; Nov. 25, 1958, 37,997/58; Jan. 21, 1959, 2,314/59; June 18, 1959, 21,027/59
4 Claims. (Cl. 260—243)

ABSTRACT OF THE DISCLOSURE 3-phenyl lower alkyl 6 - trifluoromethyl - 7 - sulfamyl-3,4-dihydro 1,2,4-benzo-thiadiazine-1,1-dioxides and intermediates are disclosed.
The final products are diuretics and saluretics.

This application is a continuation-in-part of our parent application, Ser. No. 808,863, filed Apr. 27, 1959, now abandoned.
This invention relates to new dihydrobenzothiadiazines and more particularly to compounds of the general formula

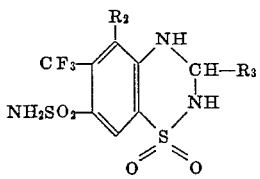

and the alkali metal salts thereof, wherein $R_2$ is hydrogen, halogen and lower alkyl; and $R_3$ is an aromatically substituted aliphatic radical. Particularly preferred are those compounds wherein $R_2$ is hydrogen; and $R_3$ is mononuclear aralkyl (preferably phenyl-lower alkyl and optimally benzyl and phenethyl).

The compounds of this invention are therapeutically useful agents because they are capable of exerting strongly saluretic and diuretic effects. Thus, the compounds of this invention are administrable parenterally and (preferably) orally in the treatment of conditions requiring saluretic or diuretic agents. Moreover, it has been surprisingly found that certain of the compounds of this invention (e.g. the 3-mononuclear aralkyl derivatives) are far more active diuretics than are the corresponding 3-unsubstituted and 3-aliphatically substituted derivatives.

The compounds of this invention can be prepared by interacting a 2,4-disulfamylaniline of the general formula

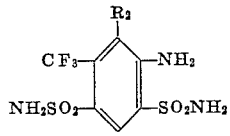

wherein $R_2$ is as hereinbefore defined, with an aldehyde of the general formula $R_3CHO$, wherein $R_3$ is as hereinbefore defined, or a reactive derivative thereof, as more fully described hereinafter, thereby yielding the compounds of this invention.

If an alkali metal salt is desired, it can be formed by the general method disclosed in U.S. Patent No. 2,809,194 by interacting the free dihydrobenzothiadiazine with an alcoholic alkali metal hydroxide (e.g. potassium hydroxide), whereby the alkali metal salt is formed.

The compounds of the invention can be produced by reacting a 2,4-disulfamylaniline with an aldehyde, or a reactive derivative thereof. The 2,4-disulfamyl-aniline reactant can be prepared, as more fully described in the following examples, by interacting an aniline with chlorosulfonic acid in the presence of an alkali metal chloride (e.g. sodium chloride) to yield the corresponding aniline-2,4-disulfonyl chloride derivative, the reaction preferably being conducted at an elevated temperature employing at least four equivalents of chlorosulfonic acid, and treating the resulting aniline-2,4-disulfonyl chloride derivative with aqueous ammonia to yield the corresponding 2,4-disulfamyl-aniline derivative. Among the suitable initial aniline reactants may be mentioned: 3-trifluoromethylanilines; 2-halo-3-trifluoromethylanilines, such as 2-chloro-3-trifluoromethylaniline; and 2-(lower alkyl)-3-trifluoromethylanilines, such as m-trifluoromethyl-o-toluidine.

The 2,4-disulfamylaniline derivative, thus obtained, is then reacted with an aldehyde or a reactive derivative thereof to give the compounds of this invention. Among the suitable aldehyde reactants may be mentioned: aralkanals, particularly mononuclear ar(lower alkanals), such as phenylacetaldehyde, α-phenylpropionaldehyde, β-phenylpropionaldehyde, β-phenyl-n-butyraldehyde, o, m, and p-tolylacetaldehyde, 6-phenylcaproaldehyde; aralkenals, particularly mononuclear ar(lower alkenals), such as cinnamaldehyde, β-phenylcrotonaldehyde, 2-phenyl-2-hexenal, and 2-phenyl-4-hexenal; aralkenals, particularly mononuclear ar(lower alkanedials) such as phenyl glyoxal, β-benzoylpropionaldehyde and γ-benzoylvaleraldehyde; diarylalkanals, particularly mononuclear diaryl-lower alkanals, such as diphenylacetaldehyde, β,β-diphenylpropionaldehyde, and α-phenyl-β-phenylpropionaldehyde; diarylalkenals, particularly, mononuclear diaryl-lower alkenals, such as β,β-diphenylcrotonaldehyde; aryloxyalkanals, particularly mononuclear aryloxy (lower alkanals), such as phenoxyacetaldehyde, β-phenoxypropionaldehyde, and γ-o, m, or p-tolyloxy-n-butyraldehyde; aralkoxyalkanals, particularly mononuclear aryl(lower alkoxy) (lower alkanals), such as benzoyloxyacetaldehyde and β-phenethoxypropionaldehyde; arylmercaptoalkanals, particularly mononuclear arylmercapto(lower alkanals), such as phenylmercaptoacetaldehyde and β-phenylmercaptopropionaldehyde; and aralkylmercaptoalkanals, particularly mononuclear aryl(lower alkyl)mercapto(lower alkanals), such as benzylmercaptoacetaldehyde, β-benzylmercaptopropionaldehyde and γ-benzylmercapto-n-butyraldehyde; as well as the mono (i.e. o, m, and p) and polyhalo (e.g. chloro), nitro, amino, and lower alkoxy (e.g. methoxy) derivatives of any of the above.

In addition to the aldahydes mentioned hereinbefore, reactive forms of these compounds may also be used. Thus, polymeric forms may be used or an acetal or enol ether or enol acetates, particularly a di(lower alkyl) acetal may be employed. The reaction is preferably conducted in the presence of an acid catalyst, such as hydrochloric, phosphoric, p-toluene sulfonic, trichloroacetic or sulfuric acid.

The following examples illustrate the invention (all temperatures being in centigrade):

EXAMPLE 1

3-benzoyl-6-trifluoromethyl-7-sulfamyl-3,4-dihydro-1,2,4-benzothiadiazine-1,1dioxide (I)

(A) PREPARATION OF 5-TRIFLUOROMETHYLANILINE-2,4-DISULFONYLCHLORIDE 113 ml. of chlorosulfonic acid is cooled in an ice-bath, and to the acid is added dropwise while stirring 26.6 g. of α,α,α-trifluoro-m-toluidine. 105 g. of sodium chloride is added during 1–2 hours, whereafter the temperature of the reaction mixture is raised slowly to 150–160°, which temperature is maintained for three hours. After cooling the mixture, ice-cooled water is added, whereby 5-trifluoromethylaniline-2,4-disulfonyl chloride separates out from the mixture.

(B) PREPARATION OF 5-TRIFLUOROMETHYL-2,4-DISULFAMYLANILINE

The 5-trifluoromethylaniline-2,4-disulfonyl chloride obtained in step A is taken up in ether and the ether solution dried with magnesium sulfate. The ether is removed from the solution by distillation, the residue is cooled to 0°, and 60 ml. of ice-cooled, concentrated ammonia water is added while stirring. The solution is then heated for one hour on a steam bath and evaporated in vacuo to crystallization. The crystallized product is 5-trifluoromethyl-2,4-disulfamylaniline, which is filtered off, washed with water and dried in a vacuum-siccator over phosphorus pentoxide. After recrystallization from a mixture of 30% ethanol and 70% water, the compound has a M.P. of 247–248°.

(C) PREPARATION OF 3-BENZOYL-6-TRIFLUOROMETHYL-7-SULFAMYL-3,4-DIHYDRO - 1,2,4 - BENZOTHIADIAZINE-1,1-DIOXIDE

A mixture of 3.2 g. of 5-trifluoromethyl-2,4-disulfamylaniline, 2.7 g. of phenylglyoxal and 50 ml. of absolute ethanol containing a catalytic amount of p-toluenesulfonic acid is boiled under reflux for 16 hours. The ethanol is removed by distillation in vacuo, and the residue is recrystallized from ethyl acetate. The product has a M.P. of 261.5–262.5°.

EXAMPLE 2

3-benzyl-6-trifluoromethyl-7-sulfamyl-3,4-dihydro-1,2,4-benzothiadiazine-1,1-dioxide (II)

6.4 g. of 5-trifluoromethyl-2,4-disulfamylaniline is dissolved in 12 ml. of dioxane. 2.7 ml. of phenylacetaldehyde and a catalytic amount of p-toluenesulfonic acid are added. After boiling for a short time under reflux, the reaction mixture crystallizes, and, after filtration and recrystallization from dioxane, the desired product is obtained with a M.P. of 224.5–225.5°.

EXAMPLE 3

3.2 g. of 5 - trifluoromethyl - 2,4 - disulfamylaniline is added to a solution of 1.35 ml. of phenylacetaldehyde in 20 ml. of 99% ethanol together with a catalytic amount of p-toluenesulfonic acid, and the mixture is boiled with reflux overnight. Thereafter, the ethanol is distilled off in vacuo to dryness and the residue is crystallized from dioxane to give a product identical to that prepared in Example 2.

EXAMPLE 4

9.6 g. of 5-trifluoromethyl-2,4-disulfamylaniline and 4.9 g. of ω-ethoxystyrene are dissolved in 35 ml. of n-butanol. 0.5 g. of p-toluenesulfonic acid is added, and the mixture is heated on a steam bath while stirring. When the solution is clear, 55 ml. of hexane is added, whereafter the mixture is heated further for one and a half hours After cooling, the substance identical to that of Example 2 is filtered off and has a M.P. of 222–223°.

EXAMPLE 5

Dipotassium salt of 3-benzyl-6-trifluoromethyl-7-sulfamyl-3,4-dihydro-1,2,4-benzothiadiazine-1,1-dioxide To a solution of 6.6 g. of 85% potassium hydroxide in 100 ml. of 95% ethanol is added gradually with shaking 21.0 g. of 3-benzyl-6-trifluoromethyl-7-sulfamyl-3,4-dihydro-1,2,4-benzothiadiazine-1,1-dioxide. The solid dissolves. The resulting alcoholic solution is concentrated in vacuo to yield the dipotassium salt as a free-flowing granular powder.

Similarly, using the equivalent quantity of sodium hydroxide instead of potassium hydroxide, the disodium salt is obtained. Furthermore, if only 3.3 g. of 85% potassium hydroxide is used in Example 5, the monopotassium salt is obtained.

EXAMPLE 6

3-styryl-6-trifluoromethyl-7-sulfamyl-3,4-dihydro-1,2,4-benzothiadiazine-1,1-dioxide (III)

Following the procedure of Example 3, but substituting cinnamaldehyde for the phenylacetaldehyde and crystallizing from ethanol rather than dioxane, 3-styryl-6-trifluoromethyl - 7 - sulfamyl-3,4-dihydro-1,2,4-benzothiadiazine-1,1-dioxide, M.P. 167–169° (with decomposition), is obtained.

EXAMPLE 7

3 - benzylmercaptomethyl - 6 - trifluoromethyl-7-sulfamyl-3,4-dihydro-1,2,4-benzothiadiazine-1,1-dioxide (IV)

3.2 g. of 5-trifluoromethyl-2,4-disulfamylaniline and 2.6 g. of benzylmercaptoacetaldehyde diethyl acetal are dissolved in 20 ml. of dioxane. A catalytic amount of p-toluenesulfonic acid is added, and the mixture is boiled with reflux overnight. After cooling, the reaction product is precipitated by addition of a mixture of methylene chloride and hexane. By recrystallization from methanol/water the desired substance is obtained with a M.P. of 202–203.5°.

EXAMPLE 8

3 - (β-benzylmercaptoethyl) - 6 - trifluoromethyl-7-sulfamyl-3,4-dihydro-1,2,4-benzothiadiazine-1,1-dioxide (V)

6.4 g. of 5-trifluoromethyl-2,4-disulfamylaniline and 3.6 g. of β-benzylmercaptopropionaldehyde are dissolved in 50 ml. of dioxane. The mixture is boiled under reflux for 17 hours. The dioxane is distilled off. The residue is dissolved in a mixture of equal amounts of dioxane and methylene chloride, and the product is precipitated by the addition of hexane. This recrystallization is repeated twice and the desired product is obtained thereby and has a M.P. of 134–136°.

EXAMPLE 9

3 - (β-phenylethyl) - 6 - trifluoromethyl-7-sulfamyl-3,4-dihydro-1,2,4-benzothiadiazine-1,1-dioxide (VI)

A mixture of 9.6 g. of 5-trifluoromethyl-2,4-disulfamylaniline, 3.6 ml. of β-phenylpropionaldehyde, a catalytic amount of p-toluenesulfonic acid and 40 ml. of methanol is boiled overnight under reflux. After cooling, 20 ml. of water is added, and the crystalline product thereby obtained is filtered off and dissolved in 40 ml. of ethanol. 20 ml. of water is added, whereby, after filtration and drying, the desired product is obtained with a M.P. of 235–236°.

EXAMPLE 10

3 - diphenylmethyl - 6 - trifluoromethyl - 7 - sulfamyl-3,4-dihydro-1,2,4-benzothiadiazine-1,1-dioxide (VII)

3.2 g. of 5-trifluoromethyl-2,4-disulfamylaniline and 2.1 g. of diphenylacetaldehyde is dissolved in 30 ml. of dioxane. A catalytic amount of p-toluenesulfonic acid is added and the mixture is boiled under reflux for five hours. After cooling, the reaction product is precipitated by the addition of methylene chloride/hexane. By recrystallization twice from ethanol/water the desired substance is obtained with a M.P. of 261–262.5°.

EXAMPLE 11

3-p-chlorobenzyl-6-trifluoromethyl-7-sulfamyl-3,4-dihydro-1,2,4-benzothiadiazine-1,1-dioxide (VIII)

3.2 g. of 5-trifluoromethyl-2,4-disulfamylaniline and 2.5 g. of p-chlorophenylacetaldehyde diethyl acetal are dissolved in 25 ml. of dioxane. A catalytic amount of p-toluenesulfonic acid is added, and the mixture was boiled with reflux over-night. After cooling, the reaction product is precipitated by addition of water. By recrystallization from methanol/water the desired substance is obtained with a M.P. of 243.5–244.5°.

EXAMPLE 12

3 - [β-(p-methoxyphenyl)-ethyl] - 6 - trifluoromethyl-7-sulfamyl - 3,4 - dihydro - 1,2,4 - benzothiadiazine-1,1-dioxide (IX)

3.2 g. of 5-trifluoromethyl-2,4-disulfamylaniline and 2.6 g. of β-(p-methoxyphenyl)-propionaldehyde diethyl acetal are dissolved in 25 ml. of dioxane. A catalytic amount of p-toluenesulfonic acid is added, and the mixture is boiled with reflux overnight. After cooling, the reaction product is precipitated by addition of water. By recrystallization from methanol/water the desired substance is obtained with a M.P. of 250.5–251.5°.

EXAMPLE 13

3-phenoxymethyl-6-trifluoromethyl-7-sulfamyl-3,4-dihydro-1,2,4-benzothiadiazine-1,1-dioxide (X)

3.2 g. of 5-trifluoromethyl-2,4-disulfamylaniline and 2.3 g. of phenoxyacetaldehyde diethyl acetal is dissolved in 30 ml. of dioxane. A catalytic amount of p-toluenesulfonic acid is added, and the mixture is boiled with reflux overnight. The reaction product is precipitated by addition of methylene chloride and hexane. By recrystallization from methanol/water the desired substance is obtained with a M.P. of 244.5–246°. (decomposition).

EXAMPLE 14

3-benzyloxymethyl-6-trifluoromethyl-7-sulfamyl-3,4-dihydro-1,2,4-benzothiadiazine-1,1-dioxide (XI)

3.2 g. of 5-trifluoromethyl-2,4-disulfamylaniline and 2.5 g. of benzyloxyacetaldehyde diethyl acetal are dissolved in 30 ml. of dioxane. A catalytic amount of p-toluenesulfonic acid is added, and the mixture is boiled with reflux overnight. Thereupon the dioxane is distilled off in vacuo, and the residue is dissolved in isopropanol. The reaction product is precipitated by addition of water. By recrystallization from isopropanol/water the desired substance is obtained with a M.P. of 221–221.5°.

EXAMPLE 15

3-(α-phenylethyl)-6-trifluoromethyl-7-sulfamyl-3,4-dihydro-1,2,4-benzothiadiazine-1,1-dioxide (XII)

Following the procedure of Example 1, step C, but substituting hydratrop aldehyde (α-phenylpropionaldehyde) for the phenylglyoxal, 3-(α-phenylethyl)-6-trifluoromethyl - 7 - sulfamyl - 3,4 - dihydro - 1,2,4-benzothiadiazine-1,1-dioxide is obtained, which after recrystallization from methanol/water has a M.P. of 242–243.5°.

EXAMPLE 16

3-p-nitrophenoxymethyl-6-trifluoromethyl-7-sulfamyl-3,4-dihydro-1,2,4-benzothiadiazine-1,1-dioxide (XIII)

3.2 g. of 5-trifluoromethyl-2,4-disulfamylaniline and 3.0 g. of p-nitrophenoxyacetaldehyde diethyl acetal are dissolved in 25 ml. of dioxane. A catalytic amount of p-toluenesulfonic acid is added, and the mixture is boiled with reflux over-night. After cooling, the reaction product was precipitated by addition of water. By recrystallization from dimethylformamide/water the desired substance is obtained with a M.P. of 261.5–262°.

EXAMPLE 17

3 - (p - aminophenoxymethyl) - 6 - trifluoromethyl-7-sulfamyl - 3,4 - dihydro-1,2,4-benzothiadiazine-1,1-dioxide (XIV)

2.4 g. of 3-(p-nitrophenoxymethyl)-6-trifluoromethyl-7-sulfamyl-3,4-dihydro-1,2,4-benzothiadiazine-1,1-dioxide is dissolved in 15 ml. of dimethylformamide and 200 mg. of $PtO_2$-catalyst is added. The mixture is shaken with hydrogen of atmospheric pressure until the theoretical amount of hydrogen has been absorbed. The catalyst is filtered off, and the dimethylformamide distilled off in vacuo. The residue is dissolved in methyl isobutyl ketone, and the reaction product precipitated by addition of methylene chloride. The precipitate is dissolved in methanol and precipitated again by addition of a mixture of methylene chloride and hexane. By recrystallization from methanol/water the desired substance is obtained with a M.P. of 193–194°.

EXAMPLE 18

3 - (2',4' - dichlorophenoxymethyl) - 6-trifluoromethyl-7-sulfamyl - 3,4 - dihydro - 1,2,4 - benzothiadiazine - 1,1-dioxide (XV)

3.2 g. of 5-trifluoromethyl-2,4-disulfamylaniline and 2.8 g. of 2,4-dichlorophenylacetaldehyde diethyl acetal are dissolved in 25 ml. of dioxane. A catalytic amount of p-toluenesulfonic acid is added, and the mixture is boiled with reflux overnight. After cooling, the reaction product is precipitated by addition of methylene chloride and hexane. By recrystallization from ethanol/water the desired substance is obtained with a M.P. of 230.5–231°.

EXAMPLES 19 AND 20

Following the procedure of Example 3, but substituting the designated aldehyde reactant for phenylacetaldehyde, the indicated 3 - Y - 6 - trifluoromethyl - 7 - sulfamyl-3,4-dihydro-1,2,4-benzothiadiazine-1,1-dioxide is obtained:

| Ex. | Compound | Y | Aldehyde reactant |
|---|---|---|---|
| 19 | XVI | β,β-Diphenylvinyl | β,β-Diphenylcrotanaldehyde. |
| 20 | XVII | β-Phenoxyethyl | β-Phenoxypropionaldehyde. |

In a series of tests with rats the saluretic effects of the compounds of this invention were determined. Thre animals each received a single oral dose of a solution of the indicated test substance. The amounts of urine were measured during the first six hours after administering the test substance, and the contents of sodium, potassium and chloride ions were determined. From these figures average values for the total excretions of the said three ions during six hours were calculated in microequivalents per group of three animals. The results of these tests are shown in the following table:

| Test Substance | Dose mg./kg. | Excretions in micro-equivalents of— | | |
|---|---|---|---|---|
| | | $Na^+$ | $K^+$ | $Cl^-$ |
| Control | 0 | 120 | 271 | 85 |
| II | 0.078 | 420 | 341 | 437 |
| | 0.156 | 634 | 419 | 718 |
| | 0.313 | 803 | 524 | 1,025 |
| | 0.625 | 982 | 590 | 1,143 |
| VII | 0.156 | 298 | 350 | 205 |
| Control | 0 | 165 | 260 | 140 |
| V | 0.156 | 486 | 380 | 452 |
| VI | 0.078 | 516 | 417 | 534 |
| | 0.156 | 714 | 395 | 961 |
| | 0.313 | 836 | 396 | 936 |
| VIII | 0.156 | 449 | 361 | 478 |
| IX | 0.625 | 676 | 536 | 779 |
| X | 0.156 | 367 | 292 | 390 |
| XI | 0.078 | 245 | 325 | 233 |
| XII | 0.156 | 505 | 361 | 575 |

As can be seen from the above table, the compounds of this invention have a high saluretic activity giving rise to high sodium and chloride excretions. Moreover, a comparison of the compounds of this invention with the corresponding 3-unsubstituted derivatives, and 3-aliphatically substituted derivatives reveals that Compounds II, VI, and XII of this invention are far more active in respect to saluretic effects than are the corresponding 3-unsubstituted and 3-aliphatically substituted derivatives.

By repeated tests with groups of 10 healty persons under conventional experimental conditions it was found that 2.0 mg. of 3-benzyl-6-trifluoromethyl-7-sulfamyl-3,4-dihydro-1,2,4-benzothiadiazine-1,1-dioxide had the same natriuretic and chlorouretic effects as 20 mg. of 3-benzyl-6 - chloro - 7 - sulfamyl - 3,4-dihydro-1,2,4-benzothiadiazine-1,1-dioxide.

What is claimed is:

1. 3 - phenyl - (lower alkyl)-6-trifluoromethyl-7-sulfamyl-3,4-dihydro-1,2,4-benzothiadiazine-1,1-dioxide.

2. 6 - trifluoromethyl-3-benzyl-7-sulfamyl-3,4-dihydro-1,2,4-benzothiadiazine-1,1-dioxide.

3. 6 - trifluoromethyl - 3 - phenethyl-7-sulfamyl-3,4-dihydro-1,2,4-benzothiadiazine-1,1-dioxide.

4. 6 - trifluoromethyl - 3 - benzoyl - 7 - sulfamyl - 3,4-dihydro-1,2,4-benzothiadiazine-1,1-dioxide.

References Cited

UNITED STATES PATENTS

| 3,230,218 | 1/1966 | Cheney et al. | 260—243 |
| 2,809,194 | 10/1957 | Novello. | |
| 2,894,948 | 7/1959 | De Stevens. | |
| 3,095,446 | 6/1963 | Margerison et al. | 260—243 |

OTHER REFERENCES

Herrmann et al., Texas State J. of Medicine (December 1958), pp. 854–858 (copy available at Natl. Lib. of Medicine).

Wall St. Journal, Nov. 5, 1958, p. 19 (Wash., D.C., Ed.).

Holdrege, Abstract of papers, 135th Am. Chem. Soc. Meeting, Apr. 5–10, 1959 (p. 19 N).

Burger, Medicinal Chemistry, p. 46 (1960), Catl. No. RS 403 B 8, Wertheim, Textbook of Organic Chemistry, pp. 763–764 (1945), QD 251 W 48.

NICHOLAS S. RIZZO, *Primary Examiner.*

W. A. MODANCE, D. G. DAUS, I. MARCUS,
*Examiners.*

E. K. MERKER, C. MUSERLIAN, G. S. ROSEN,
*Assistant Examiners.*